United States Patent
Kwon et al.

(10) Patent No.: US 11,301,201 B2
(45) Date of Patent: Apr. 12, 2022

(54) METHOD AND APPARATUS FOR PLAYING AUDIO FILES

(71) Applicant: Samsung Electronics Co., Ltd., Suwon-si (KR)

(72) Inventors: Zi On Kwon, Miryang-si (KR); Hye Won Kim, Seoul (KR); Hyung Woo Shin, Seoul (KR); Son Young Lee, Seoul (KR); Seung Yong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

(21) Appl. No.: 16/354,858

(22) Filed: Mar. 15, 2019

(65) Prior Publication Data

US 2019/0212972 A1 Jul. 11, 2019

Related U.S. Application Data

(63) Continuation of application No. 14/842,063, filed on Sep. 1, 2015, now Pat. No. 10,275,207.

(51) Int. Cl.
*G06F 3/16* (2006.01)
*G06F 3/0482* (2013.01)
*G06F 3/04847* (2022.01)

(52) U.S. Cl.
CPC ............ *G06F 3/165* (2013.01); *G06F 3/0482* (2013.01); *G06F 3/04847* (2013.01)

(58) Field of Classification Search
CPC ..... G06F 3/165; G06F 3/0482; G06F 3/04847
See application file for complete search history.

(56) References Cited

U.S. PATENT DOCUMENTS

| 4,941,187 A | 7/1990 | Slater |
| 6,141,529 A | 10/2000 | Remschel |
| 6,850,496 B1 | 2/2005 | Knappe et al. |
| 7,006,616 B1 | 2/2006 | Christofferson et al. |

(Continued)

FOREIGN PATENT DOCUMENTS

| JP | 2010-231089 A | 10/2010 |
| KR | 10-2011-0019162 A | 2/2011 |

(Continued)

OTHER PUBLICATIONS

Wood, "Technical guide for mono and stereo signals", published: Sep. 26, 2004, Copyright 1995-2004, https://person2.sol.lu.se/SidneyWood/praate/monstee.html (Year: 2004).*

(Continued)

*Primary Examiner* — Seth A Silverman
(74) *Attorney, Agent, or Firm* — Jefferson IP Law, LLP

(57) ABSTRACT

An electronic device is provided. The electronic device includes a controller configured to execute one or more modules, an audio reproduction module configured to reproduce an audio file including reproduction sections, each of the reproduction sections comprising audio data and directional information, a display configured to display selectable objects corresponding to the directional information, and an audio control module configured to determine whether to reproduce audio data corresponding the directional information based on an input for selecting one of the selectable objects.

16 Claims, 8 Drawing Sheets

(56) References Cited

U.S. PATENT DOCUMENTS

| | | |
|---|---|---|
| 7,298,930 B1 | 11/2007 | Erol et al. |
| 7,843,486 B1 | 11/2010 | Blair et al. |
| 8,335,580 B2 | 12/2012 | Ikeda et al. |
| 8,700,392 B1 | 4/2014 | Hart et al. |
| 8,712,564 B2 | 4/2014 | Kindo et al. |
| 9,043,005 B2 | 5/2015 | Sandler et al. |
| 9,467,786 B2 | 10/2016 | Lee et al. |
| 9,743,033 B2 | 8/2017 | Kim et al. |
| 2002/0049589 A1 | 4/2002 | Poirier |
| 2003/0112947 A1 | 6/2003 | Cohen |
| 2003/0138108 A1 | 7/2003 | Gentle |
| 2004/0013252 A1 | 1/2004 | Craner |
| 2004/0263636 A1 | 12/2004 | Cutler |
| 2005/0024484 A1 | 2/2005 | Leonard et al. |
| 2005/0280701 A1 | 12/2005 | Wardell |
| 2005/0281410 A1 | 12/2005 | Grosvenor |
| 2006/0067500 A1 | 3/2006 | Christofferson et al. |
| 2006/0256974 A1 | 11/2006 | Oxford |
| 2007/0260690 A1 | 11/2007 | Coleman |
| 2007/0294263 A1 | 12/2007 | Punj et al. |
| 2008/0144794 A1 | 6/2008 | Gardner |
| 2008/0228299 A1 | 9/2008 | Ikeda |
| 2009/0148124 A1 | 6/2009 | Athsani et al. |
| 2009/0254843 A1 | 10/2009 | Van Wie et al. |
| 2009/0282335 A1 | 11/2009 | Alexandersson |
| 2010/0020951 A1 | 1/2010 | Basart et al. |
| 2010/0231534 A1 | 9/2010 | Chaudhri et al. |
| 2010/0322387 A1 | 12/2010 | Cutler |
| 2010/0324891 A1 | 12/2010 | Cutler |
| 2011/0013075 A1* | 1/2011 | Kim .................. H04N 5/602 348/370 |
| 2011/0058662 A1 | 3/2011 | Yoakum et al. |
| 2011/0137437 A1* | 6/2011 | Jonsson .................. G10L 15/26 700/94 |
| 2011/0268418 A1 | 11/2011 | Jones et al. |
| 2011/0270933 A1 | 11/2011 | Jones et al. |
| 2011/0280388 A1 | 11/2011 | Kindo et al. |
| 2011/0312375 A1 | 12/2011 | Kim et al. |
| 2012/0062729 A1* | 3/2012 | Hart ....................... H04N 7/142 348/135 |
| 2012/0166642 A1 | 6/2012 | Saint Clair et al. |
| 2013/0222371 A1 | 8/2013 | Reitan |
| 2013/0232413 A1 | 9/2013 | Cho |
| 2013/0297308 A1 | 11/2013 | Koo et al. |
| 2013/0297319 A1 | 11/2013 | Kim |
| 2013/0300648 A1 | 11/2013 | Kim et al. |
| 2013/0311178 A1 | 11/2013 | Lee |
| 2013/0311186 A1 | 11/2013 | Lee et al. |
| 2014/0067770 A1 | 3/2014 | Cheong et al. |
| 2014/0135042 A1 | 5/2014 | Buchheim et al. |
| 2014/0201637 A1 | 7/2014 | Na et al. |
| 2014/0223157 A1 | 8/2014 | Li et al. |
| 2014/0294183 A1 | 10/2014 | Lee et al. |
| 2014/0295811 A1 | 10/2014 | Uusitalo et al. |
| 2014/0314391 A1 | 10/2014 | Kim et al. |
| 2015/0019227 A1 | 1/2015 | Anandarajah |
| 2015/0186109 A1* | 7/2015 | Jarvinen .................. G06F 3/167 715/728 |
| 2015/0346845 A1* | 12/2015 | Di Censo .................. G06F 3/013 707/766 |
| 2016/0036962 A1 | 2/2016 | Rand |
| 2017/0019745 A1 | 1/2017 | Lee et al. |

FOREIGN PATENT DOCUMENTS

| | | |
|---|---|---|
| KR | 10-2014-0095874 A | 8/2014 |
| KR | 10-2014-0114238 A | 9/2014 |
| KR | 10-2014-0118060 A | 10/2014 |
| WO | 00/72560 A1 | 11/2000 |

OTHER PUBLICATIONS

Korean Notice of Allowance dated Feb. 18, 2021; Korean Appln. No. 10-2014-0167782.

* cited by examiner

METHOD AND APPARATUS FOR PLAYING AUDIO FILES

CROSS-REFERENCE TO RELATED APPLICATION(S)

This application is a continuation application of prior Application Ser. No. 14/842,063, filed on Sep. 1, 2015, which was based on and claimed priority under 35 U.S.C. § 119(a) of a Korean patent application number 10-2014-0167782, filed on Sep. 1, 2014 and of a Korean patent application number 10-2014-0115706, filed on Nov. 27, 2014, in the Korean Intellectual Property Office, the disclosure of each of which is incorporated by reference herein in their entirety.

TECHNICAL FIELD

The present disclosure relates to an electronic device configured to record contents of a meeting, in which a plurality of users participates, and reproduce contents recorded according to a direction in which a user is located.

BACKGROUND

An electronic device such as a smart phone may include a microphone. The electronic device may include two or more microphones to recognize a user voice accurately and to provide improved voice call quality.

A user may use a voice recording function which is performed using a microphone included in an electronic device. Afterwards, the user may playback a recorded voice (or file) to hear recorded contents.

According to the related art, in the case of recording contents of a meeting, in which a plurality of users participates, it may be difficult to identify which user speaks. As the number of persons participating in a meeting increases, identifying whether any participant speaks may become more difficult.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide method and apparatus for recognizing and storing a direction in which a sound is generated and reproducing a sound of a selected direction. For example, since a direction of a sound at a meeting in which a plurality of users participates is decided according to a direction in which a user is located, it may be possible to selectively reproduce a voice of a specific user by matching a direction of a sound and a user.

In accordance with an aspect of the present disclosure, an electronic device is provided. The electronic device includes a controller configured to execute one or more modules, an audio reproduction module configured to reproduce an audio file including reproduction sections, each of the reproduction sections comprising audio data and directional information, a display configured to display selectable objects corresponding to the directional information, and an audio control module configured to determine whether to reproduce audio data corresponding the directional information based on an input for selecting one of the selectable objects.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
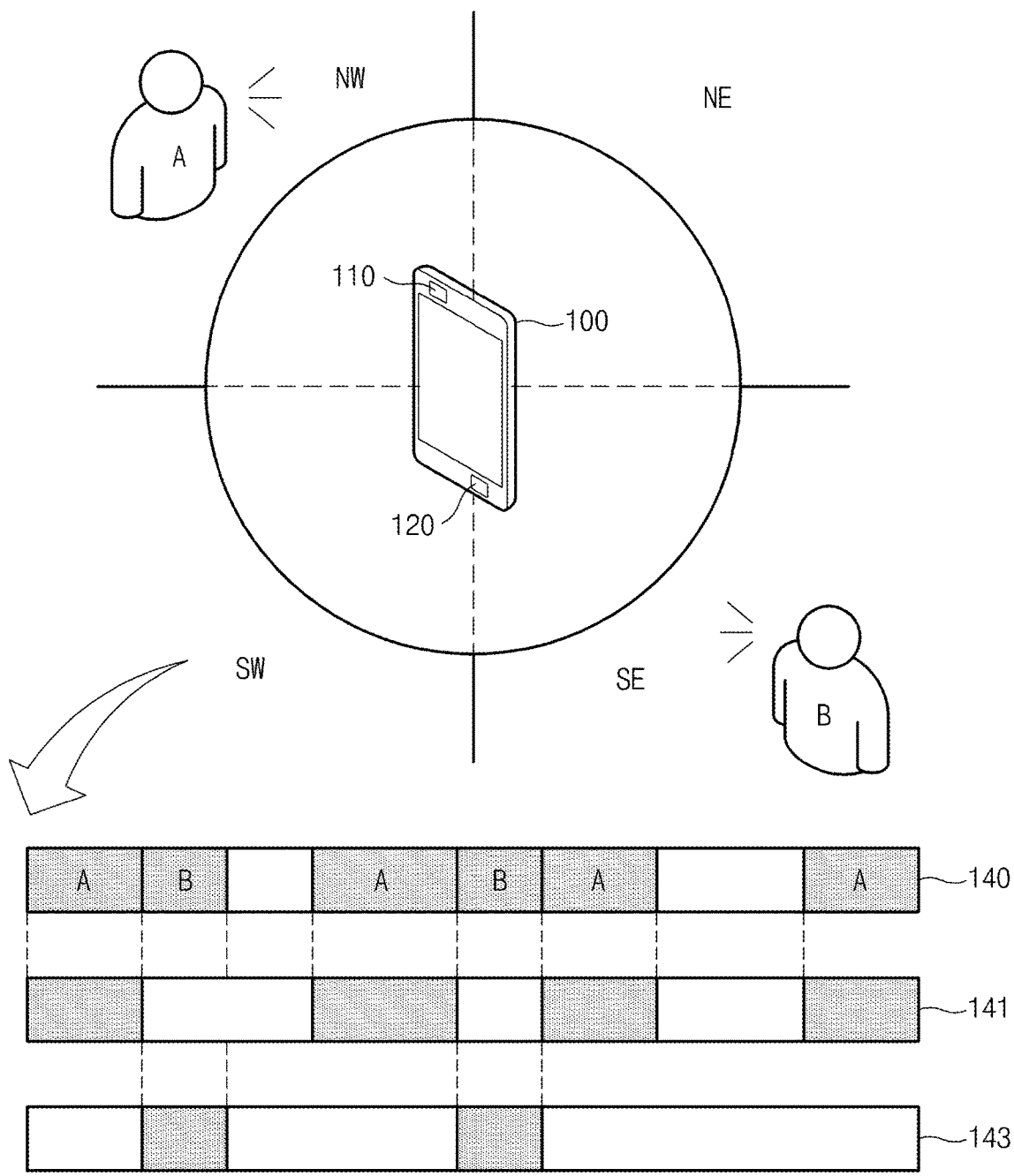
FIG. 1 is a diagram of an audio file according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modification of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing from the scope of the present disclosure, a first element may be referred to as a second element, and similarly, a second element may be referred to as a first element.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Moving Picture Experts Group phase 1 or phase 2 (MPEG-1 or MPEG-2) audio layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

Hereinafter, electronic devices according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 is a diagram of an audio file according to an embodiment of the present disclosure.

Referring to FIG. 1, an audio file may be generated at a meeting environment in which a plurality of persons participates. For example, at a meeting in which a person A and a person B participate, the persons A and B may speak at any position in the meeting environment. For example, when participating in a meeting, the person A and the person B may face each other, may sit in a diagonal direction, or may sit at various positions.

An electronic device 100 may record the meeting. The electronic device 100 may include a plurality of microphones (e.g., a microphone 110 and a microphone 120) to determine whether any of the participants speaks. For example, the microphones may be placed at the top end portion and the bottom end portion of the electronic device 100 and may recognize a surrounding sound of the electronic device 100.

Various advantages may be obtained if the electronic device 100 obtains a sound using a plurality of microphones. For example, the electronic device 100 may determine a direction in which a sound is generated using a directional recognition algorithm in which a phase difference between sounds generated from a plurality of microphones is used. Furthermore, the electronic device 100 may compare pieces of sound data obtained from microphones to cancel a noise.

The electronic device 100 may obtain a sound using a sound recognition module other than a microphone. All or a part of the above-described microphones may be replaced with various sensors supporting a sound recognition function.

In an example of FIG. 1, the electronic device 100 may identify a sound having a power in decibels (dB) that exceeds a threshold level as speech of a user and may identify a sound below the threshold level as noise. Furthermore, the electronic device 100 may recognize a direction from which the voice is provided, together with audio data corresponding to a sound of a user.

The electronic device 100 may divide directions of sounds into a plurality of directional groups. The direction may be a direction toward an upper microphone from a lower microphone of an electronic device, a true north or magnetic north direction of a magnetic sensor, a direction set by a user, or the like. For instance, the electronic device 100 may classify sounds into directional groups of sectors of a circle such as, e.g., northeast (NE) quarter, southeast (SE) quarter, southwest (SW) quarter, and northwest (NW) quarter. The directional groups may be subdivided according to performance of the electronic device 100, the number of microphones included in the electronic device 100, or performance of the microphones. For example, the electronic device 100 may classify directions of sounds into 8 sectors each having a range of 45 degrees clockwise or into 12 sectors each having a range of 30 degrees clockwise. According to various embodiments of the present disclosure, the electronic device 100 may classify the sectors into having different angles. For example, in the case where eight persons participate in a meeting at a rectangular table in which a width is greater than a length (e.g., in the case where a single person sits at each of width sides and three persons sit at each of lengthwise sides), the electronic device 100 may classify directions of sounds into two groups, each lengthwise side is set to a range of 60 degrees to obtain a sound of the person sitting at a width side, and into six groups, each set to a range of 40 degrees to obtain a sound of each person sitting on the lengthwise sides.

Returning to FIG. 1, the electronic device 100 may determine a sound heard from the NW direction as a sound of the person A and a sound heard from the SE direction as a sound of the person B, and may store audio data and directional information corresponding to each person in an audio file 140. To cancel noise, the electronic device 100 may delete (or perform silent treatment on) audio data in a direction in which sound does not exceed a specific dB level. Additionally or generally, the electronic device 100 may use audio data from a direction in which a sound does not exceed a specific dB level as an input of active noise cancellation (ANC) on a voice of a person. Furthermore, when sounds are recognized in various directions (directions corresponding to different groups or people), the electronic device 100 may perform decision such that a sound of a higher dB is included in the audio file 140.

The audio file 140 which is generated according to the above-described method may have a plurality of sections. For example, in an exemplification of FIG. 1, the audio file 140 may include sections corresponding to a sound of person A, sections corresponding to a sound of person B, and silent sections not including a sound of anyone. That is, the audio file 140 may have a plurality of reproduction sections and may include directional information (i.e., the directional information being capable of be replaced with user information) corresponding to each reproduction section. The audio file 140 of FIG. 1 may have a more complicated structure. For example, the audio file 140 may have reproduction sections corresponding to Pt to $12^{th}$ participants and silent sections, and each reproduction sections may correspond to 12 directional groups each having a range of 30 degrees.

Unless stated herein, an audio file disclosed in this specification may have a characteristics of the above-described audio file 140. According to various embodiments of the present disclosure, the electronic device 100 may select a specific user (or a specific direction) and may selectively reproduce a sound of the selected user (i.e., a reproduction section corresponding to the selected user). Below, a configuration of an electronic device according to an embodiment of the present disclosure will be described with reference to FIG. 2, and an audio file generating method and audio file reproducing and managing methods will be described with reference to FIGS. 3 and 4.

Figure 2:
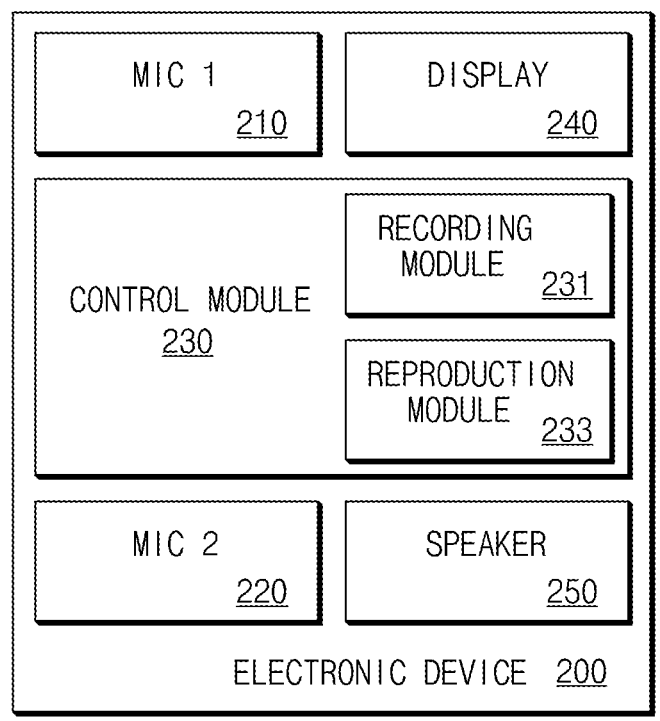
FIG. 2 is a block diagram of an electronic device according to an embodiment of the present disclosure.

FIG. 2 is a block diagram of an electronic device according to an embodiment of the present disclosure.

Referring to FIG. 2, an electronic device 200 may include a first microphone 210, a second microphone 220, a control module 230, a display 240, and a speaker 250. The control module 230 may include a recording module 231 and a reproduction module 233. The electronic device 200 may be understood as being an embodiment of an electronic device 100 illustrated in FIG. 1.

A portion of components of the electronic device 200 may be replaced with sensors or modules for performing corresponding functions. Furthermore, some components may be omitted from or added to an electronic device according to an embodiment of the present disclosure. For example, if the electronic device 200 performs only a function for recording an audio file (e.g., an audio file 140), components such as the reproduction module 233 and the display 240 may be omitted. Likewise, if the electronic device 200 performs only a function for reproducing an audio file, components such as the microphones 210 and 220 and the recording module 231 may be omitted. The electronic device 200 may further include a transmitter and a receiver (not illustrated) if the electronic device 200 receives an audio file from an external device or provides an audio file to an external device.

Each of the first microphone 210 and the second microphone 220 may receive sound to obtain sound information and may provide the obtained sound information to the control module 230. According to some embodiments of the present disclosure, the electronic device 200 may include three or more microphones. The electronic device 200 may further include a digital-to-analog converter (DAC) for converting an analog signal obtained from each microphone into a digital signal. Furthermore, a plurality of microphones (e.g., a first microphone 210 and a second microphone 220) included in the electronic device 200 may be disposed at different positions. For example, the first microphone 210 may be placed at a top end portion of the electronic device 200, and the second microphone 220 may be placed at a bottom end portion of the electronic device 200.

The control module 230 may generate an audio file using sound information obtained from microphones 210 and 220. For example, the recording module 231 may extract audio data from the sound information and may determine a direction in which a sound is generated (i.e., directional information), and may generate an audio file based on the extracted audio data and the determined direction.

The control module 230 may reproduce the audio file. For example, the reproduction module 233 may reproduce the audio file including audio data and directional information of each section. The reproduction module 233 may also reproduce an audio file (e.g., an MP3 file and the like) which does not have directional information. The control module 230 may control the reproduction module 233 such that audio data (e.g., a sound of a specific user) generated in a specific direction is reproduced according to selection of a user.

According to various embodiments of the present disclosure, the control module 230 may be understood as being a processor. For example, the control module 230 may correspond to an arithmetic device such as a central processing unit (CPU) or an application processor (AP). A processor may control various electronic devices disclosed in this specification.

The display 240 may output a recording state or a reproduction state. For example, the display 240 may output a screen indicating whether a sound currently generated in any direction is recorded in an audio file. Various user interfaces (UIs) which the display 240 provides will be described below with reference to FIGS. 4 to 7.

The electronic device 200 may include a speaker 250. Audio data reproduced by the reproduction module 233 may be output through the speaker 250. According to some embodiments of the present disclosure, an audio file may be reproduced using another device of the electronic device 200. For example, the electronic device 200 may include a communication module for supporting a network connection, such as wireless fidelity (Wi-Fi) or Bluetooth®, and may be connected to an external device (e.g., a Bluetooth speaker) that supports a remove speaker function, through the communication module. The control module 230 of the electronic device 200 may transmit audio data to the external device through the communication module and the audio file may be reproduced through the external device. The above examples describe reproducing audio using a wireless network connection. However, the electronic device 200 may be connected to a speaker device in a wired manner. The above-described configuration may be possible to reproduce an audio file through wired/wireless connection between the same types of electronic devices (e.g., a smart phone to a smart phone) or different types of electronic devices (e.g., a smart phone to a smart watch, a smart phone to a tablet, a PC to a smart phone, and the like).

Additionally, although not illustrated, the electronic device may further include a memory. Files, data (e.g., audio data), instructions, applications, modules, and the like stored in the memory may be executed by a processor (e.g., a control module 230).

Figure 3:
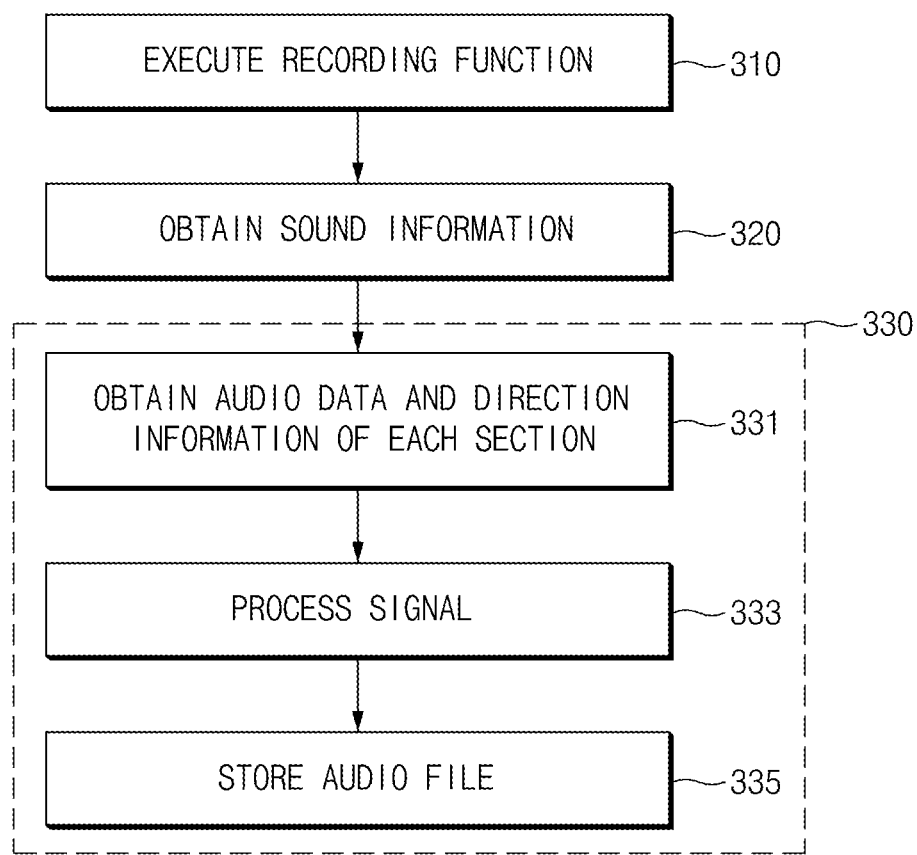
FIG. 3 is a flowchart of a method for generating an audio file according to an embodiment of the present disclosure.

FIG. 3 is a flowchart of a method for generating an audio file according to an embodiment of the present disclosure.

Referring to FIG. 3, in operation 310, an electronic device may perform an audio recording function. For example, a recording application or a meeting application which the electronic device supports may be executed. When a recording function is executed, the electronic device may previously decide a direction from which a sound is input, based on a user input, a specific setting, or the like. For example, in the case where four users participate in a meeting, four directions may be previously set such that each direction has a range of 90 degrees. According to some embodiments of the present disclosure, the electronic device may obtain sounds in all directions and may classify directions of sounds into groups of which the number is maximally supportable at the electronic device. For example, if the electronic device (or a plurality of microphones included in the electronic device) provides meaningful accuracy within a range of 30 degrees with respect to a direction of a sound, the electronic device may divide an obtained sound into 12 directions (12*30 degrees=360 degrees).

According to various embodiments of the present disclosure, the electronic device may block sounds generated in some directions. For example, in the case where three persons participate in a meeting and speak from the east, west, and south directions, respectively, sound generated in a north direction may not be associated with the meeting. Accordingly, the electronic device may exclude audio received from a direction that is not occupied by a person from an audio file. According to some embodiments of the present disclosure, the electronic device may delete a sound input of a specific direction through a user input after an audio file is reproduced.

In operation 320, the electronic device may obtain sound information. The sound information may be obtained through a plurality of microphones. According to various embodiments of the present disclosure, the sound information may be obtained through a plurality of microphones.

In operation 330, the electronic device may generate an audio file based on the received sound information. The audio file generated in operation 320 may have a plurality of reproduction sections. Each reproduction section may include audio data and directional information. However, a portion of the plurality of reproduction sections may be sections in which no sound is reproduced. According to various embodiments of the present disclosure, such a reproduction section may be referred to as a "silent section".

Below, operation 330 will be more fully described with reference to operations 331, 333, and 335. In operation 331, the electronic device may obtain audio data and directional information of each section from the sound information. Here, the directional information may be directional information on a sound having the highest dB. For example, the electronic device may define one reproduction section based on a point where a direction in which sound information is generated is changed into another direction or a dB level becomes lower than a reference value or where a dB level is lower than the reference value for the reference time (e.g., 2 seconds). For example, in the case where a direction in which a sound is generated is changed into a second direction from a first direction, a user may assign a sound, which is generated from the first direction, to a first reproduction section and a sound, which is generated from the second direction, to a second reproduction section. If a sound is generated again from the first direction or a sound is generated from a third direction, the user may assign a sound, which is generated in a corresponding direction, to a third reproduction section. Furthermore, if a sound having a dB level greater than the reference value is not generated, the user may assign a corresponding section to a silent section.

In operation 333, the electronic device may perform signal processing on the obtained audio data. The signal processing may include a noise cancelling technique. Also, the electronic device may remove all audio data that is not generated in a corresponding direction from the audio data obtained in a different reproduction section. For example, if a user sound generated in a direction between 0 degree and 30 degrees during 1 to 10 seconds is determined as main data (a sound having the highest dB), audio data belonging to 30 to 360 degrees (a range of 330 degrees) may be removed within a reproduction section between 1 second and 10 seconds.

In operation 335, the electronic device may store an audio file including the above-described audio data and directional information. The audio file may have information on a reproduction section corresponding to each direction as meta-information (or metadata). In an audio file having 10 sections, for example, audio data of a first direction (i.e., a first user) may be included in the audio file as information in the $2^{nd}$, $4^{th}$, $7^{th}$, and $9^{th}$ sections, audio data of a second direction (i.e., a second user) may be included in the audio file as information in the $1^{st}$, $3^{rd}$, $5^{th}$, and $10^{th}$ sections, and a silent section may be included in the audio file as information in the $6^{th}$ and $8^{th}$ sections.

Figure 4:
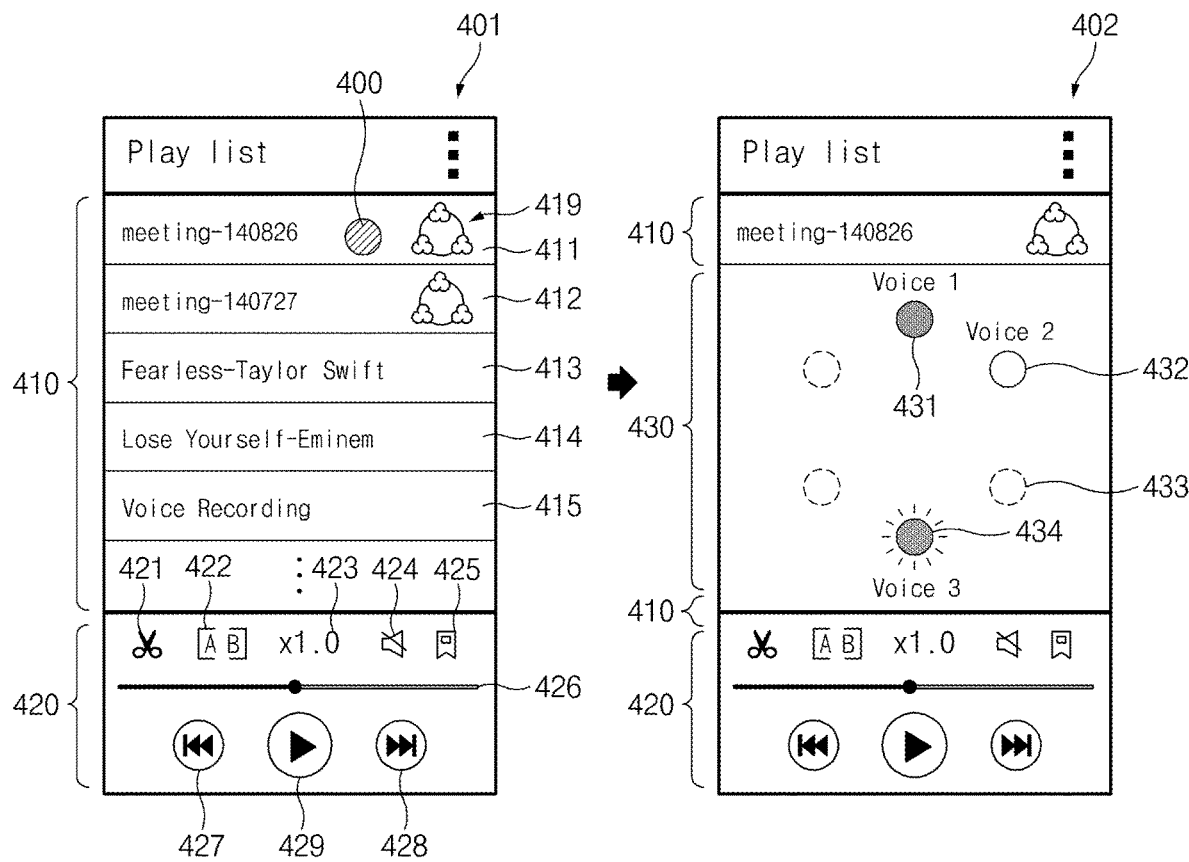
FIG. 4 is a diagram of a user interface (UI) provided to reproduce an audio file according to an embodiment of the present disclosure.

FIG. 4 is a diagram of a UI provided to reproduce an audio file according to various embodiments of the present disclosure.

Referring to FIG. 4, when a user executes a function for reproducing an audio file, the UI illustrated in FIG. 4 may be output. The UI illustrated in FIG. 4 may be modified or changed appropriately.

According to an embodiment of the present disclosure, a UI 401 may be provided when a meeting application or an audio reproduction application (e.g., a music player), or the like is executed. The UI 401 may include a play list 410 indicating a list of contents to be reproduced and a control area 420 for controlling functions associated with reproduction and edition of contents.

The play list 410 may include general music files as well as audio files generated according to a method of FIG. 3. For example, the play list 410 may include various types of audio files such as audio items 411 and 412 (e.g., meeting_140826 and meeting_140727) having directional information according to an embodiment of the present disclosure, musical items 413 and 414, a voice recording item 415 of a user, and the like. According to an embodiment of the present disclosure, however, the play list 410 may only include an audio file having directional information according to an embodiment of the present disclosure. Furthermore, in the case where an audio file is an audio file having directional information, the play list 410 may provide a display (e.g., an icon 419) indicating the presence of directional information in the audio file.

An area (e.g., a width and a height) of the play list 410 may be fixed. For example, in the case where pieces of contents are included in the play list 410, a position of a control area 420 displayed at a bottom end portion of the display may be fixed even though a list of contents is scrolled. In other words, the play list 410 may be scrolled in an area other than the control area 420.

If any content included in the play list 410 having directional information is selected, the UI 401 may be changed into an UI 402. For example, in the case where the play list 410 is an expandable list, if a user selects the audio item 411 (e.g., a touch input 400), an area between the audio item 411 and the audio item 412 may be expanded and an object corresponding to directional information (or user information corresponding to each direction) included in an audio file may be output in an area 430. Other unselected contents 412, 413, 414, and 415 of the play list 410 may be covered with the detailed information area 430. That is, if any contents are selected, the area 410 illustrated at the UI 401 may be replaced with a list (e.g., an audio file 411) of the selected contents and an item (e.g., objects displayed in the detailed information area 430) associated with the selected contents. If the touch input 400 is provided with respect to a general music item 413, words or an album art of a corresponding song may be output in the area 430 that generated as an area (a boundary) between the item 413 and the item 414 is expanded. At this time, the item 411 may be moved to the top end portion of the UI 402, and the items 414 and 415 may be moved to the bottom end portion of the UI 402. Accordingly, the items 414 and 415 may not be shown at the display. If a user scrolls a screen at the UI 402, items covered due to expansion of the play list may be displayed.

According to various embodiments of the present disclosure, a user input on the play list 410 may not affect the control area 420. That is, the control area 420 may be maintained even though the play list 410 is expanded. Furthermore, an input on the control area 420 may not affect the play list 410. For example, an UI of a screen may not be changed into the UI 402 even though a play button 429 of the control area 410 is selected to reproduce specific contents (e.g., an item 411).

According to various embodiments of the present disclosure, the play list 410 may provide detailed information area 430 on one item at a time. For example, when the item 411 is selected, if a user selects an item 414 through a scroll input, the detail information area 430 between the items 411 and 412 may be closed and disappear, and information (e.g., an album art, words, and the like) on the item 414 may be provided between the item 414 and the item 415. In other words, if a user selects the item 414 through a scroll input, the item 414 may be located at the area 410 of FIG. 4, information on the item 414 may be provided at the detailed information area 430 of FIG. 4, and the item 415 (and other additional items) may be located at an area (capable of being checked through a scroll) under the area 430.

Referring to the UI 402, if a reproduced audio file includes a plurality of reproduction sections, audio data, and directional information on each reproduction section, the electronic device may analyze the audio file to determine a number of directional groups included in the audio file, the number of directions set when the audio file is generated, reproduction and silent sections corresponding to directions, and the like. In the example illustrated in FIG. 4, the electronic device may analyze an audio file "meeting_140826" to determine that the audio file includes audio data obtained from three directions and the audio file when six directions are recognizable.

The electronic device may display a selectable object corresponding to each directional group in the directional information. For example, the electronic device may output six objects corresponding to the above-described six directions to the display, and it may be possible to select objects 431, 432, and 434, corresponding to three directions in which audio data is input from the six objects. The electronic device (a reproduction module 222) may reproduce an audio file in a manner variable according to a user input on a selectable object. This will be described in detail with reference to FIG. 5.

A non-selectable object (e.g., an object 433) may be displayed by a dotted line or faintly or may not be displayed. Furthermore, currently selected objects (e.g., objects 431 and 434) may be displayed with a specific color, and an unselected objects (e.g., an object 432) may be displayed with a black and white or a border. Various display methods may be used according to a setting. Meanwhile, a currently selected object of selectable objects may be understood as having an active state (i.e., an active object), and an unselected object may be understood as being inactive (i.e., an inactive object).

According to various embodiments of the present disclosure, while a reproduction section being currently output through a speaker 250 of the electronic device corresponds to a specific direction (e.g., a direction corresponding to an object 434), the display may express a corresponding object with a separate effect. For example, a predetermined expression may appear around the object 434, a color of the object 434 may be changed, or the object 434 may flicker. The various effects to indicate active or inactive objects may be used.

The control area 420 may provide various controls to affect reproduction of contents. For example, an icon 421 may allow a user to cut a portion of contents to edit a length of the contents. A partial section of an audio file corresponding to the item 411 may be removed by selecting the item 411 and selecting the icon 421. According to some embodiments of the present disclosure, the icon 421 may support deleting at least one reproduction section included in an audio file. For example, it may be possible to delete first and second sections, including pieces of voice data of person A and person B respectively, from among a plurality of sections included in an audio file. Further, the icon 421 may support deleting a plurality of reproduction sections included in an audio file by direction unit. For example, all reproduction sections corresponding to a direction of the object 431 may be deleted by selecting the icon 421.

An icon 422 may support repetition on a specific section of contents. In the case where contents are an audio file having a plurality of reproduction sections, the icon 422 may support a repetition function of a reproduction section unit.

An icon 423 may support a varying speed reproduction function. According to some embodiments of the present disclosure, the icon 423 may support a quad-speed function on a reproduction section corresponding to a specific direction. For example, in the case where a user, corresponding to a direction of the object 433, from among people participating in a meeting either talks unnecessarily or too slow, it may be possible to reproduce audio data in fast speed (e.g., x1.2) using the icon 423.

An icon 424 may provide a skip function on a silent section. For example, in the case where the icon 424 is in a "skip silence off" state, reproduction on a silent section may be maintained. If the icon 424 is in a "skip silence on" state, a reproduction module 233 may skip the silent section. This function may be advantageous to check meeting contents by skipping sections that do not include speech. According to some embodiments of the present disclosure, the icon 424 may remain in an inactive state (in the case where the icon 424 remains at an active state when the play list 410 includes a general music file or a file for a foreign language lesson, a strange sound may be heard in playing a corresponding file if a silent section is skipped). According to other embodiments of the present disclosure, in the case where one of selectable objects displayed at the area 430 is inactivated (i.e., in the case where a silent section increases because audio data of a reproduction section corresponding to a corresponding object is not reproduced), the icon 424 may be automatically activated. In this case, the reproduction module 233 may output only audio data corresponding to an activated object and may skip audio data and a silent section corresponding to an unselected object. According to various embodiments of the present disclosure, the icon 424 may be activated/inactivated according to selection of a user.

An icon 425 may provide a bookmark function. Similarly to the above-described other functions, the bookmark function may be applied to the whole audio file. Alternatively, the bookmark function may be applied to a specific reproduction section of an audio file or to a reproduction section corresponding to a specific user (i.e., direction).

A progress bar may indicate a reproduction status of an audio file. Furthermore, according to some embodiments of the present disclosure, the progress bar 426 may include information on a reproduction section. In addition, icons 427, 428, and 429 may be icons for supporting general reproduction functions such as rewind/previous track, fast forward/next track, and play/pause, and a detailed description thereon may be omitted.

In FIG. 4, the electronic device may change from the UI 401 to the UI 402. According to some embodiments of the present disclosure, however, the electronic device may directly provide the UI 402. For example, the UI 402 may be directly provided in the case of selecting an audio file (an audio file including a plurality of reproduction sections and directional information) at a short message service (SMS), a chatting message, e-mail, website, and the like.

Figure 5:
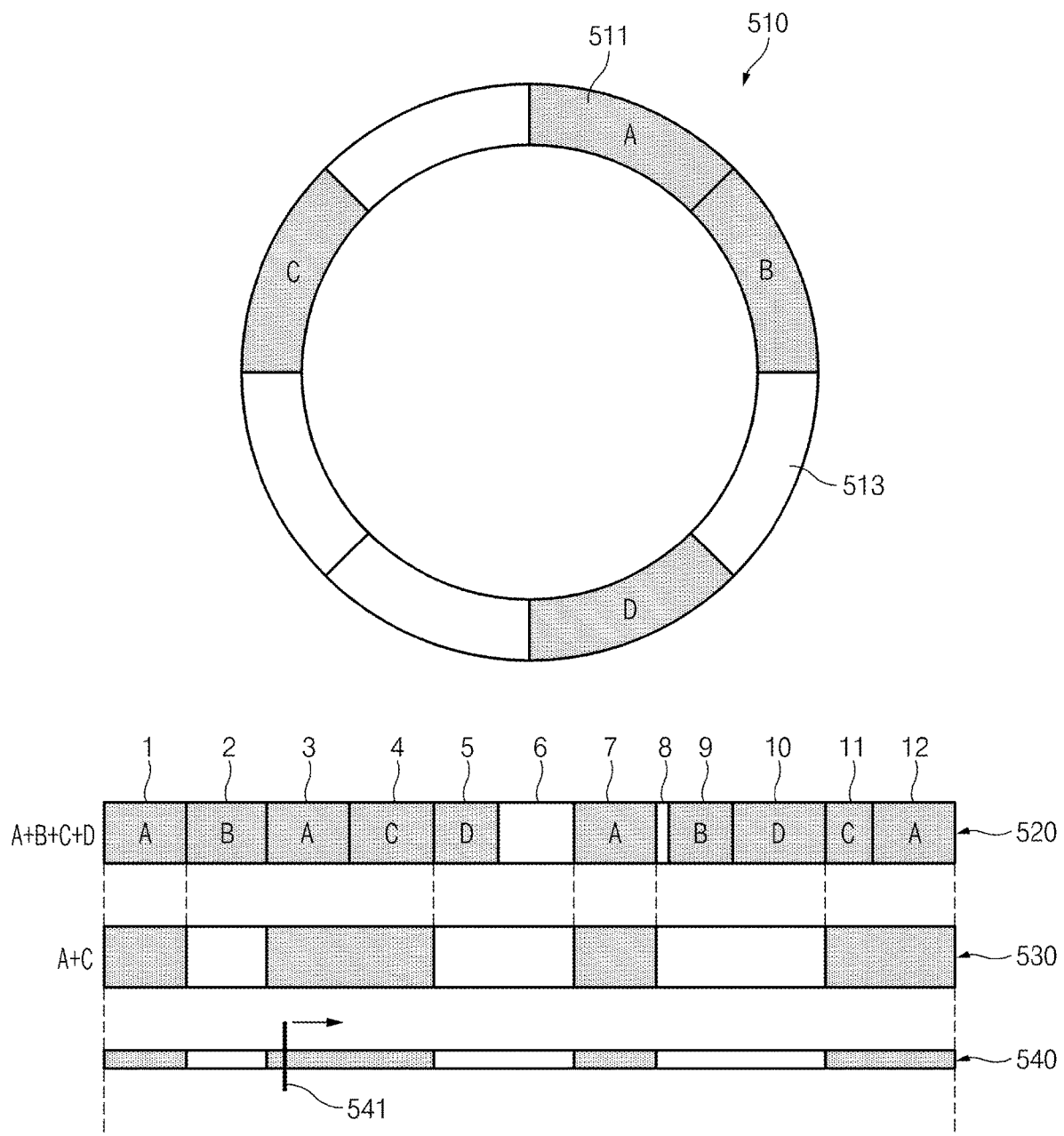
FIG. 5 is a diagram illustrating a reproduction section due to object selection, according to an embodiment of the present disclosure.

FIG. 5 is a diagram illustrating a reproduction section due to object selection according to an embodiment of the present disclosure.

Referring to FIG. 5, a circular object 510 may be another example of a plurality of objects displayed in an area 430 of FIG. 4. An electronic device may express objects corresponding to directional information in various shapes at a display. According to an embodiment of the present disclosure, it may be possible to display a plurality of objects with pieces of directional information matched with a plurality of icons formed from an annulus. According to another embodiment of the present disclosure, it may be possible to display an object structure with a ring structure partitioned to correspond to directional information. Below, a description may be given with reference to an exemplification illustrated in FIG. 5.

The circular object 510 may include eight objects. Four objects 511, corresponding to directions A, B, C, and D, from among the eight objects may be selectable. Each of the objects 511 may correspond to audio data or a reproduction section corresponding to each direction.

Other objects 513 not corresponding to the four directions may be non-selectable. According to an embodiment of the present disclosure, the four objects may not be displayed or may not be classified. For example, two directions between a direction C and a direction D may not be classified. Below, a description will be given under assumption that the directions A, B, C, and D correspond to persons A, B, C, and D.

Sounds of all users may be reproduced when reproduction of an audio file is initiated. In this case, a progress bar may be uniformly displayed (e.g., with one color or with one pattern). According to some embodiments of the present disclosure, however, the progress bar may have a section mark corresponding to a progress bar 520. For example, in the case where an audio file of FIG. 5 has 12 sections, the electronic device may display the progress bar such that different sections are distinguishable from each other. For example, the electronic device may display the progress bar 426 such that the silent section is expressed with a while color and the section not being the silent section is expressed with a gray color.

In FIG. 5, if a selection input on the user B and the user D is made, objects corresponding to the user B and the user D may be changed into an inactive state. In this case, audio data of a reproduction section corresponding to an object of an inactive state may not be reproduced. For example, audio data of the $2^{nd}$ and $9^{th}$ sections corresponding to the user B and audio data of the $5^{th}$ and $10^{th}$ sections corresponding to the user D may not be reproduced. If the input is provided, the electronic device may change the section expression of the progress bar into a form corresponding to the progress bar 530. For example, the electronic device may change the progress bar in the form of progress bar 540.

In the progress bar 540, a progress point 541 may indicate a point where an audio file is being currently reproduced. According to some embodiments of the present disclosure, if reaching the $4^{th}$ section (a section in which audio data of the user C is reproduced), an inactivated reproduction section (a $5^{th}$ section corresponding to a section in which audio data of the user D is reproduced) and a silent section (a $6^{th}$ section) may be skipped such that the progress point 541 directly move to a $7^{th}$ section. For example, in the case where an icon 424 is activated or a setting is made to skip a silent section, the electronic device may not reproduce a silent section (including an actual silent section and a section experiencing silent treatment according to selection of a user).

According to an embodiment of the present disclosure, in the case where all users are at an active state and a progress point is placed at a $9^{th}$ section, audio data of users B, D, C, and A may be included in remaining reproduction sections of the audio file. If the progress point 541 moves to a $10^{th}$ section, audio data of users D, C, and A may be included in remaining reproduction sections of the audio file. In this case, an object, corresponding to the user B may be automatically changed into an inactive state. That is, the object structure 510 may provide user information (i.e., directional information) of remaining audio data. If the progress point 541 moves to any point before the $9^{th}$ section, an object corresponding to the user B may be again changed into an active state. However, even though the progress point 541 is changed, an object manually inactivated by selection of the user may remain in an inactivate state before an active input of the user is provided.

Figure 6:
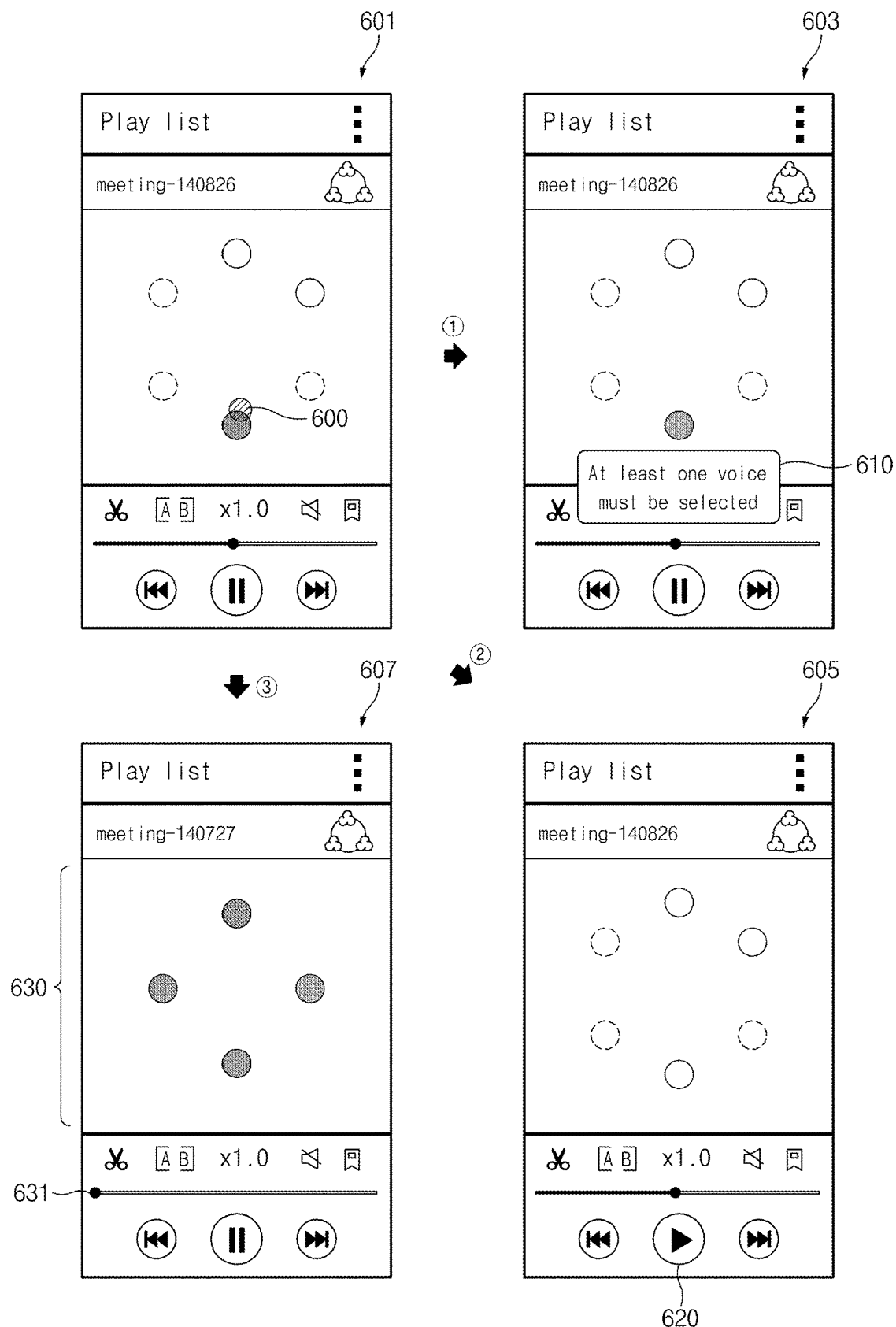
FIG. 6 illustrates operations performed when the last activate object is selected according to an embodiment of the present disclosure.

FIG. 6 illustrates operations performed when the last activate object is selected according to an embodiment of the present disclosure.

Referring to FIG. 6, a UI 601 may indicate a screen in which an input 600 for switching Voice 3 into an inactive state is provided under the condition that Voice 1 (an object 431) and Voice 2 (an object 432) in an UI 401 of FIG. 4 are inactivated and unique Voice 3 (an object 434) having an active state is being reproduced.

When all objects to be reproduced are inactivated by an input 600, the electronic device may perform various operations. In FIG. 6, three possible operations may be exemplified, and various modified embodiments may be possible.

First, the electronic device may provide a UI 602 (exemplification ①). If there is provided an input 600 for inactivating the last active object, the electronic device may provide a message 610 (e.g., "at least one voice must be selected") indicating that at least one object has to be maintained at an active state in an appropriate form (e.g., popup, overlay, and the like). The provided message may disappear due to an input (e.g., a touch input) of a user or due to the lapse of time. The above-described message may be provided together with a vibration effect or the like.

Meanwhile, the electronic device may provide a UI 605 (exemplification ②). For example, if the input 600 is for inactivating the last active object, the electronic device may inactivate all objects and may pause reproduction of an audio file (e.g., changing a control icon into an icon 620 allowing a reproduction command to be performed at the pause state).

If a reproduction command is received under the above-described state (e.g., if the icon 620 is selected), the electronic device may reproduce an audio file in various methods. For example, the electronic device may reproduce audio data of a reproduction section corresponding to the last inactivated object while activating the last inactivated object. As another example, the electronic device may activate all objects corresponding to reproduction sections remaining after a pause point in time and may reproduce audio data of the activated objects. For example, in the case where reproduction sections corresponding to users of Voice 3 and Voice 1 exist (assuming that reproduction sections corresponding to a user of Voice 2 are all reproduced before a pause), the electronic device may activate all objects corresponding to Voice 3 and Voice 1 and may reproduce audio data of reproduction sections (remaining after a pause point in time) corresponding to Voice 3 and Voice 1.

As a further example, if any object (a selectable object) is selected at such a state, the electronic device may resume reproducing an audio file. In this case, the electronic device may reproduce an audio file from a paused point in time or may resume reproducing an audio file from a reproduction section corresponding to any object after a paused point in time.

Meanwhile, the electronic device may provide a UI 607 (exemplification ③). For example, a user may control reproduction of an audio file while selecting objects. In this case, a user that intends to deactivate all objects may be understood as requesting to obtain necessary contents from a corresponding audio file or stop reproducing the audio file. In this case, if there is provided an input 600 for inactivating the last object, the electronic device may stop reproducing a corresponding audio file (e.g., meeting-140826) and may reproduce a next file (meeting-140727) of a play list (e.g., a play list 410). In this case, a reproduction screen 630 of a meeting file (or a file on a meeting in which four users participate) having directional information may be provided in a UI 607. All objects may be at an active state at the beginning of reproduction, and a progress point 631 may be placed at a start point of a next file (e.g., meeting-140727).

Figure 7:
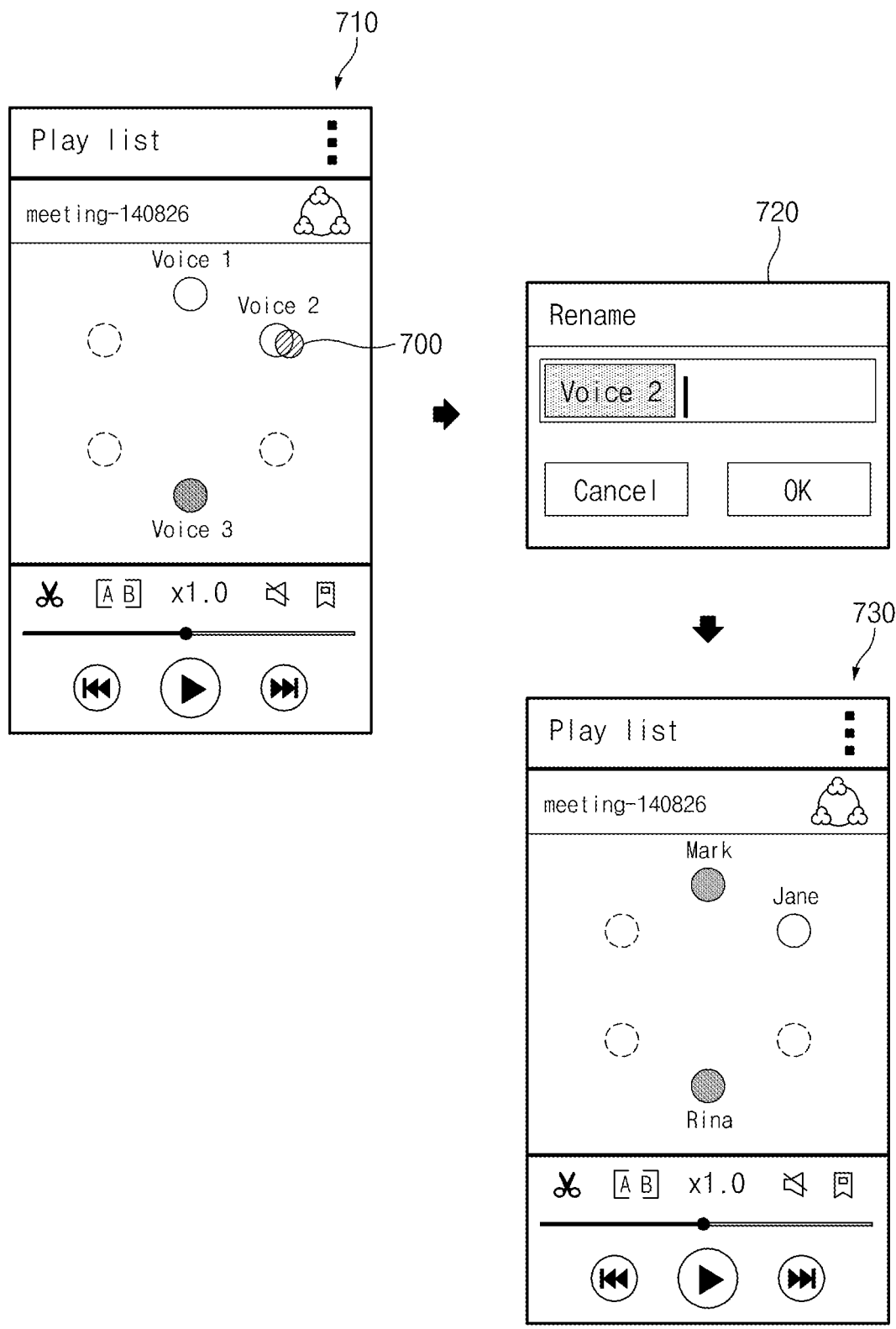
FIG. 7 is a diagram illustrating a method for registering user information according to an embodiment of the present disclosure.

FIG. 7 is a diagram illustrating a method for registering user information according to an embodiment of the present disclosure.

Referring to FIG. 7, an electronic device may determine audio data, which is obtained in one direction, as audio data obtained from one user. The electronic device may basically assign arbitrary user names, such as Voice 1, Voice 2, and Voice 3, to objects corresponding to respective directions as illustrated in screen 710, respectively. A user may change a name indicating an object through an input. For example, if a long press input is provided with respect to an object Voice 2, the electronic device may provide a screen (or a popup menu) 720 for changing a name corresponding to the object Voice 2. For example, if the user registers "Mark", "Jane", and "Rina" as names of Voice 1, Voice 2, and Voice 3, respectively, the electronic device may provide a screen 730 named according to a user input with respect to each object.

According to various embodiments of the present disclosure, a plurality of users may densely sit in one direction (e.g., a direction corresponding to Voice 2). In this case, a user may input user information with respect to an object corresponding to the direction. For example, in the above-described example, a user may input "Jane, Cindy, and Jason" with respect to an object corresponding to Voice 2 to inform that three persons participate in a meeting in a corresponding direction.

According to various embodiments of the present disclosure, the electronic device may merge different pieces of audio data that are provided from different directions. For example, assuming that a person A and a person B participate in a meeting, an audio file such as a screen 710 may be generated/reproduced even though the person A moves from an original position (e.g., a direction corresponding to Voice 1 in FIG. 7) to another position (e.g., a direction corresponding to Voice 2 in FIG. 7) during the meeting. In this exemplification, since Voice 1 and Voice 2 are audio data recorded by the same person, merging of pieces of audio data obtained in a corresponding direction may be performed.

For example, the electronic device may unify pieces of audio data of Voice 1 and Voice 2 in response to a touch input such as an input for dragging and dropping an icon of Voice 1 toward a position of Voice 2. In this case, user information (e.g., a name) of the unified audio data may be defined based on user information of a firstly selected icon (e.g., Voice 1). Afterwards, even though one of icons of Voice 1 and Voice 2 is activated/inactivated by a user, the icons of Voice 1 and Voice 2 may be activated/inactivated at the same time. In other words, if audio data of Voice 1 having directional information of 330 to 030 degrees and audio data of Voice 2 having directional information of 030 to 090 degrees are unified, the unified data may be recognized as audio data having directional information of 330 to 090 degrees.

As another exemplification, the electronic device may unify pieces of audio data of Voice 1 and Voice 2 in response to a touch input (e.g., a pinch-to-zoom) such as an input for selecting (e.g., multi-touch) and drawing icons of Voice 1 and Voice 2. The electronic device may separate the unified audio data into pieces of audio data of Voice 1 and Voice 2 using a pinch input of a direction opposite to a unification direction.

As an example, the electronic device may support a function in which it is possible to simultaneously touch an icon of Voice 1 and an icon of Voice 2 during a time. In response to the touch input, the electronic device may merge pieces of audio data of Voice 1 and Voice 2 or may output a message requesting merging, if possible. If the merged audio data is touched for a time, the electronic device may separate the merged audio data into pieces of audio data based on an original direction or may output a message requesting unmerging, if possible. If the electronic device supports a multi-touch such as a three-point touch or a four-point touch, pieces of audio data obtained in several directions may be unified according to the number of concurrent touch inputs, which the electronic device supports, at a time.

The electronic device may support merging/separation of audio data through various gesture inputs, thereby making it possible to appropriately merge pieces of audio data into a piece of audio data when a participant moves during a meeting or when sound data generated at one position is detected from two or more positions (e.g., in the case where a position is near to boundary point where the electronic device is capable of recognizing a direction of a sound).

Figure 8:
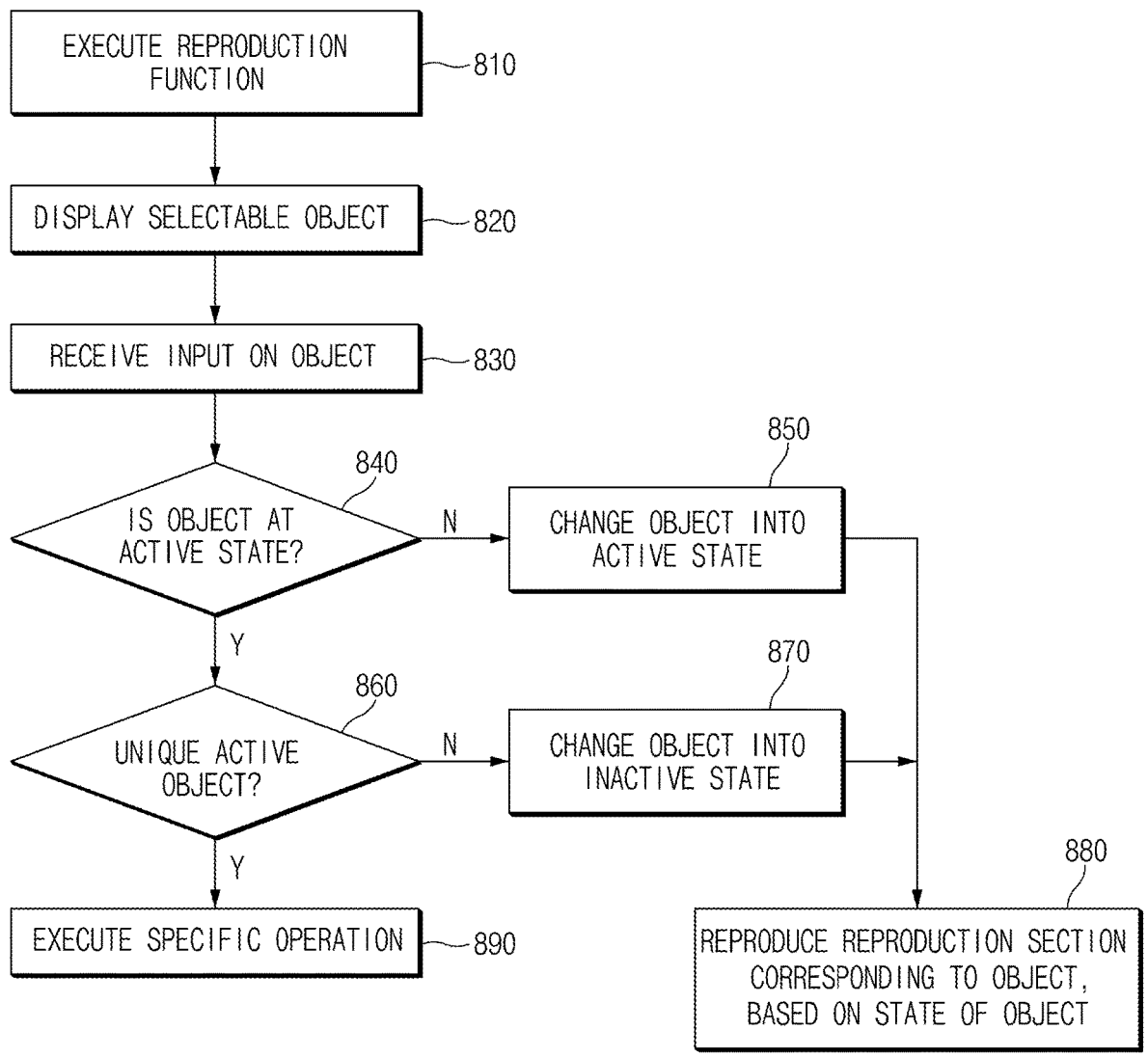
FIG. 8 is a flowchart of an audio file reproducing method according to an embodiment of the present disclosure.

FIG. 8 is a flowchart of an audio file reproducing method according to an embodiment of the present disclosure.

Referring to FIG. 8, in operation 810, an electronic device may execute a reproduction function. For example, the electronic device may execute the reproduction function when a specific application is executed or when a predetermined command on contents stored at the electronic device or provided from a website to which the electronic device connects. The reproduced audio file may include a plurality of reproduction sections, audio data, and directional information on each reproduction section.

In operation 820, the electronic device may display at least one selectable object corresponding to directional information. For example, in the case where the electronic device supports separation of sounds received in six different directions, it may display six objects corresponding to the six directions. In the case where valid sounds are recognized in three directions (e.g., above a reference dB), the electronic device may display objects corresponding to the three directions as being selectable. Furthermore, the electronic device may set all selectable objects to an active state when an audio file is initially reproduced and may reproduce audio data included in a reproduction sections of the audio file.

In operation 830, the electronic device may receive an input on an object. For example, the electronic device may receive a touch input of a user or a touch/hovering input through various input units (e.g., a stylus such as S-pen, an electronic pen, and the like).

In operation 840, the electronic device may determine if an object is in an active state based on an input received with respect to the object. If the object is in the inactive state in operation 840, the object is changed into the active state in operation 850. However, if the object is in the active state at operation 850, it is determined if the object is a unique active object in operation 860. If the active object in not unique, the object is changed into the inactive state in operation 870. If the active object is a unique active object, in operation 890, the electronic device may perform a specific operation, which is described with reference to FIG. 6, based on whether a selected object is a unique object having an active state in operation 860. For example, the electronic device may output a message, indicating that an active state of a unique object having an active state has to be maintained and at least one object has to be at an active state, or may change the object into an inactive state to pause reproduction or to start to reproduce a next audio file.

After the object is changed state in operations 850 or 860, in operation 880, the electronic device may determine whether to reproduce audio data corresponding to an object based on an active/inactive state of the object. For example, the electronic device may not reproduce audio data of a reproduction section corresponding to an object of an inactive state. Furthermore, the electronic device may reproduce audio data of a reproduction section corresponding to an object of an active state. For example, in the case where reproduction sections corresponding to an object A may include $1^{st}$, $3^{rd}$ and $5^{th}$ sections and reproduction sections corresponding to an object B may include $2^{nd}$ and $6^{th}$ sections, the electronic device may reproduce only the $2^{nd}$ and $6^{th}$ sections.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" according to various embodiments of the present disclosure may include at least one of an application-specific integrated circuit (ASIC) chip, a field-programmable gate array (FPGA), and a programmable-logic device for performing some operations, which are known or will be developed.

According to various embodiments of the present disclosure, at least a portion of an apparatus (e.g., modules or functions thereof) or a method (e.g., operations) according to various embodiments of the present disclosure, for example, may be implemented by instructions stored in a computer-readable storage media in the form of a programmable module. The instruction, when executed by one or more processors, may cause the one or more processors to perform a function corresponding to the instruction. For example, the storage medium may include an audio file including a plurality of reproduction sections and audio data and directional information on each reproduction section, and the instruction may cause an electronic device to perform a method including displaying at least one selectable object corresponding to the directional information, receiving an input for selecting the object, changing an active or inactive state of the selected object based on the input, and determining whether to reproduce audio data corresponding to the object, based on a state of the object. Besides, the storage medium may further include instructions for executing the above-described methods.

A computer-readable recording medium may include a hard disk, a magnetic media such as a floppy disk and a magnetic tape, an optical media such as compact disc read only memory (CD-ROM) and a digital versatile disc (DVD), a magneto-optical media such as a floptical disk, and hardware devices such as a ROM, random access memory (RAM), and a flash memory. Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a programming module according to an embodiment of the present disclosure may include at least one of the above elements, or a portion of the above elements may be omitted, or additional other elements may be further included. Operations performed by a module, a programming module, or other elements according to an embodiment of the present disclosure may be executed sequentially, in parallel, repeatedly, or in a heuristic method. Also, a portion of operations may be executed in different sequences, omitted, or other operations may be added.

According to various embodiments of the present disclosure, when an electronic device reproduces an audio file recorded at a meeting, a sound generated in a specific direction or a sound of a user located in a specific direction may be selectively reproduced, thereby making it possible to selectively check a sound of a desired user or to selective remove sounds obtained in some directions. This may enable a user to effectively check contents recorded in an audio file.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    microphones;
    a display;
    a memory storing instructions; and
    at least one processor configured to execute the stored instructions to:
        control the microphones to obtain sound around the electronic device,
        classify, based on the obtained sound, directions of at least two sound sources including a first sound source corresponding to a first direction and a second source corresponding to a second direction different from the first direction,
        assign, based on the obtained sound, at least one reproduction section of a plurality of reproduction sections as a silent section not including a sound where a decibel (dB) level is lower than a reference value, and
        generate an audio file comprising the plurality of reproduction sections, including at least one first section corresponding to the first sound source, at least one second section corresponding to the second source, the at least one silent section, and directional information corresponding to the first direction and the second direction, wherein each reproduction section of the plurality of reproduction sections comprises audio data and the directional information, and wherein each reproduction section of the plurality of reproduction sections is defined based on a point where a dB level of the sound becomes lower than the reference value or where the dB level is lower than the reference value for a reference time.

2. The electronic device of claim 1, wherein a phase difference between sounds is used to classify the first direction and the second direction.

3. The electronic device of claim 1, wherein a sound having a dB power that exceeds the reference value is identified as speech of a user, and a sound below the reference value is identified as noise.

4. The electronic device of claim 1, wherein the directional information is replaced with user information.

5. The electronic device of claim 1, wherein the directions of at least two sound sources are divided by a range of degrees based on accuracy provided by the microphones.

6. A method to record an audio file using an electronic device, the method comprising:

controlling microphones to obtain sound around the electronic device;

classifying, based on the obtained sound, directions of at least two sound sources including a first sound source corresponding to a first direction and a second source corresponding to a second direction different from the first direction;

assigning, based on the obtained sound, at least one reproduction section of a plurality of reproduction sections as a silent section not including a sound where a decibel (dB) level is lower than a reference value; and generating the audio file comprising the plurality of reproduction sections, including at least one first section corresponding to the first sound source, at least one second section corresponding to the second source, the at least one silent section, and directional information corresponding to the first direction and the second direction, wherein each reproduction section of the plurality of reproduction sections includes audio data and the directional information, and wherein each reproduction section of the plurality of reproduction sections is defined based on a point where a dB level of the sound becomes lower than the reference value or where the dB level is lower than the reference value for a reference time.

7. The method of claim 6, wherein a phase difference between sounds is used to classify the first direction and the second direction.

8. The method of claim 6, wherein a sound having a dB power that exceeds the reference value is identified as speech of a user, and a sound below the reference value is identified as noise.

9. The method of claim 6, wherein the directional information is replaced with user information.

10. The method of claim 6, wherein the directions of at least two sound sources are divided by a range of degrees based on accuracy provided by the microphones.

11. A non-transitory storage medium including computer-readable instructions, the instruction causing an electronic device to:

control microphones to obtain sound around the electronic device;

classify, based on the obtained sound, directions of at least two sound sources including a first sound source corresponding to a first direction and a second source corresponding to a second direction different from the first direction;

assign, based on the obtained sound, at least one reproduction section of a plurality of reproduction sections as a silent section not including a sound where a decibel (dB) level is lower than a reference value; and generate an audio file comprising the plurality of reproduction sections, including at least one first section corresponding to the first sound source, at least one second section corresponding to the second source, the at least one silent section, and directional information corresponding to the first direction and the second direction, wherein each reproduction section of the plurality of reproduction sections comprises audio data and the directional information, and wherein each reproduction section of the plurality of reproduction sections is defined based on a point where a dB level of the sound becomes lower than the reference value or where the dB level is lower than the reference value for a reference time.

12. The non-transitory storage medium of claim 11, wherein a phase difference between sounds is used to classify the first direction and the second direction.

13. The non-transitory storage medium of claim 11, wherein a sound having a dB power that exceeds the reference value is identified as speech of a user, and a sound below the reference value is identified as noise.

14. The non-transitory storage medium of claim 11, wherein the directional information is replaced with user information.

15. The non-transitory storage medium of claim 11, wherein the directions of at least two sound sources are divided by a range of degrees based on accuracy provided by the microphones.

16. The non-transitory storage medium of claim 11, wherein each reproduction section of the plurality of reproduction sections includes audio data and the directional information.

* * * * *